US010498201B2

(12) United States Patent
Fujii et al.

(10) Patent No.: US 10,498,201 B2
(45) Date of Patent: Dec. 3, 2019

(54) ELECTRIC COMPRESSOR

(71) Applicant: KABUSHIKI KAISHA TOYOTA JIDOSHOKKI, Kariya-shi, Aichi-ken (JP)

(72) Inventors: Akio Fujii, Aichi-ken (JP); Kenji Momma, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 56 days.

(21) Appl. No.: 15/852,806

(22) Filed: Dec. 22, 2017

(65) Prior Publication Data

US 2018/0183304 A1    Jun. 28, 2018

(30) Foreign Application Priority Data

Dec. 27, 2016 (JP) ................................. 2016-254257

(51) Int. Cl.
*H02K 11/33*        (2016.01)
*H01G 9/12*         (2006.01)
(Continued)

(52) U.S. Cl.
CPC ............... *H02K 11/33* (2016.01); *H01G 9/06* (2013.01); *H01G 9/12* (2013.01); *H01G 9/28* (2013.01);
(Continued)

(58) Field of Classification Search
CPC ...... H02K 11/33; H02K 7/14; H02K 2211/03; H02K 11/0094; H01G 9/06; H01G 9/12;
(Continued)

(56) References Cited

U.S. PATENT DOCUMENTS 5,091,823 A * 2/1992 Kanbara ................. H02M 5/44
                                                     174/351
7,972,123 B2 * 7/2011 Koide ................. F04B 27/0873
                                                     417/411
(Continued)

FOREIGN PATENT DOCUMENTS

JP       04-012515 A      1/1992
JP       2000294944    * 10/2000
(Continued)

OTHER PUBLICATIONS

Communication dated Dec. 20, 2018, issued by the Korean Intellectual Property Office in corresponding Korean Application No. 10-2017-0179290.

*Primary Examiner* — Mang Tin Bik Lian
*Assistant Examiner* — Ahmed Elnakib
(74) *Attorney, Agent, or Firm* — Sughrue Mion, PLLC

(57) ABSTRACT

An electric compressor includes a housing and a cover. The housing accommodates a compression portion and an electric motor. The cover is attached to an outer surface of the housing and cooperates with the outer surface of the housing to define an accommodation space. An inverter is accommodated in the accommodation space and configured to drive the electric motor. The inverter includes a circuit board, an electrolytic capacitor, and a capacitor cover at least partly covering the electrolytic capacitor. The electrolytic capacitor includes a cylindrical main body having a first end and a second end, a lead extending from the first end of the main body and connected to the circuit board, and a pressure relief vent on the second end of the main body. The capacitor cover is interposed between the circuit board and a peripheral edge of the second end of the electrolytic capacitor.

5 Claims, 4 Drawing Sheets

(51) Int. Cl.
*H02K 7/14* (2006.01)
*H01G 9/06* (2006.01)
*H01G 9/28* (2006.01)
*F25B 31/02* (2006.01)
*H01G 9/145* (2006.01)

(52) U.S. Cl.
CPC .............. *H02K 7/14* (2013.01); *F25B 31/026* (2013.01); *H01G 9/145* (2013.01); *H02K 2211/03* (2013.01)

(58) Field of Classification Search
CPC .......... H01G 9/28; H01G 9/145; F04C 23/02; F04C 18/0215; F25B 31/026
USPC .................................. 310/68 R, 67 R, 87, 88
See application file for complete search history.

(56) References Cited

U.S. PATENT DOCUMENTS

| | | | |
|---|---|---|---|
| 9,017,045 B2 | 4/2015 | Kinoshita et al. | |
| 9,065,317 B2* | 6/2015 | Enami | H05K 7/20463 |
| 9,523,362 B2* | 12/2016 | Koide | H05K 1/0254 |
| 2014/0377097 A1* | 12/2014 | Yano | F01C 21/10 |
| | | | 417/411 |
| 2015/0056086 A1* | 2/2015 | Yano | F04C 18/02 |
| | | | 417/410.5 |
| 2015/0061558 A1* | 3/2015 | Yano | F04B 39/121 |
| | | | 318/400.26 |
| 2015/0357844 A1* | 12/2015 | Koide | H05K 1/0254 |
| | | | 318/139 |
| 2018/0183304 A1* | 6/2018 | Fujii | H02K 11/33 |
| 2018/0330887 A1* | 11/2018 | Elekes | H01G 9/008 |

FOREIGN PATENT DOCUMENTS

| | | |
|---|---|---|
| JP | 2012-193660 A | 10/2012 |
| JP | 3189331 U | 2/2014 |
| JP | 2015-40538 A | 3/2015 |
| JP | 2016-182031 A | 10/2016 |
| KR | 10-2015-0000838 A | 1/2015 |

* cited by examiner

ELECTRIC COMPRESSOR

BACKGROUND OF THE INVENTION

The present invention relates to an electric compressor.

An electric compressor generally includes a housing for accommodating a compression portion and an electric motor. The compression portion is configured to compress refrigerant, and the electric motor is configured to drive the compression portion. The electric compressor further includes a cover attached to the outer surface of the housing to accommodate an inverter that drives the electric motor. Japanese Unexamined Patent Application Publication No. 2012-193660 discloses an electric compressor including an inverter that includes a circuit board on which electronic components are mounted. For example, the electronic components include an electrolytic capacitor. The electrolytic capacitor is formed by, for example, a pair of metal foils (e.g. aluminum foils) having an insulating oxide layer as dielectric on at least one of the foils, liquid electrolyte, and a separator. The pair of metal foils is wound with the separator interposed between the two foils to form a capacitor element. The capacitor element is impregnated with liquid electrolyte and sealed in the main body of the electrolytic capacitor.

In the event that overvoltage is applied to the electrolytic capacitor for any cause, the liquid electrolyte in the electrolytic capacitor may evaporate, thus causing pressure build-up in the electrolytic capacitor. To release the pressure from the electrolytic capacitor, the electrolytic capacitor includes a pressure relief vent (explosion-proof vent), however, the liquid electrolyte may be splashed out of or seep from the electrolytic capacitor by opening of the pressure relief vent, thereby impairing the insulation of the circuit board.

The present invention, which has been made in light of the above-described problem, is directed to providing an electric compressor having a configuration that prevents liquid electrolyte from being splashed out of or seeping from an electrolytic capacitor into a circuit board in the event that a pressure relief vent of the electrolytic capacitor is opened.

SUMMARY OF THE INVENTION

In accordance with one aspect of the present invention, there is provided an electric compressor including a housing and a cover. The housing accommodates a compression portion and an electric motor. The cover is attached to an outer surface of the housing and cooperates with the outer surface of the housing to define an accommodation space. An inverter is accommodated in the accommodation space and configured to drive the electric motor. The inverter includes a circuit board, an electrolytic capacitor, and a capacitor cover at least partly covering the electrolytic capacitor. The electrolytic capacitor includes a cylindrical main body having a first end and a second end, a lead extending from the first end of the main body and connected to the circuit board, and a pressure relief vent on the second end of the main body. The capacitor cover is interposed between the circuit board and a peripheral edge of the second end of the electrolytic capacitor.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the embodiment together with the accompanying drawings in which.

DETAILED DESCRIPTION OF THE EMBODIMENTS

An embodiment of the present invention will now be described with reference to FIGS. 1 to 5. The electric compressor of the present invention is used for vehicle air conditioners.

Figure 1:
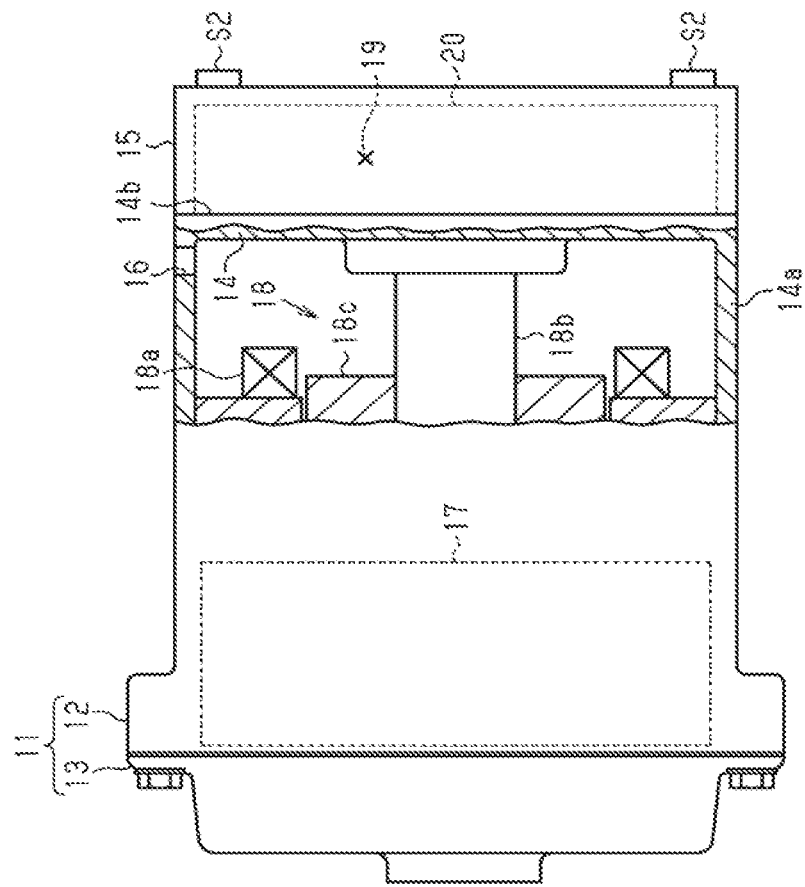
FIG. 1 is a cutout view of an electric compressor according to an embodiment of the present invention.

Referring to FIG. 1, an electric compressor designated by 10 includes a cylindrical housing assembly 11. The housing assembly 11 is made of a metal such as aluminum and includes a first housing 12 and a second housing 13. The first housing 12 includes a bottom wall 14 having a circular plate shape and a side wall 14a extending from the peripheral edge of the bottom wall 14, so that the first housing 12 is formed in a bottomed-cylindrical shape with an open end. The second housing 13 has a bottomed-cylindrical shape and is fixed to the first housing 12 so as to cover the opening of the first housing 12. The side wall 14a of the first housing 12 has therethrough an inlet 16. The inlet 16 passes through the side wall 14a of the first housing 12 in a radial direction of the first housing 12 to allow entry of refrigerant into the first housing 12.

The first housing 12 of the housing assembly 11 accommodates a compression portion 17 and an electric motor 18. The compression portion 17 is configured to compress refrigerant, and the electric motor 18 is configured to drive the compression portion 17. The electric motor 18 includes a rotary shaft 18b, a rotor 18c integrated with the rotary shaft 18b, and a stator 18a disposed on the inner periphery of the first housing 12. The axial direction of the rotary shaft 18b corresponds to the axial direction of the first housing 12.

The electric compressor 10 further includes a cylindrical cover 15 with one end closed. The cover 15 is attached to a surface 14b of the bottom wall 14. The surface 14b of the bottom wall 14 faces away from the electric motor 18. The cover 15 and the bottom wall 14 of the first housing 12 cooperate to define an accommodation space 19 in which an inverter module 20 is accommodated. The surface 14b of the bottom wall 14 of the first housing 12, which faces away from the electric motor 18, corresponds to the outer surface of the housing assembly 11 of the present invention. The inverter module 20 configured to drive the electric motor 18 is accommodated in the accommodation space 19 that is defined by the cover 15. That is, the inverter module 20 is covered with the cover 15.

Figure 2:
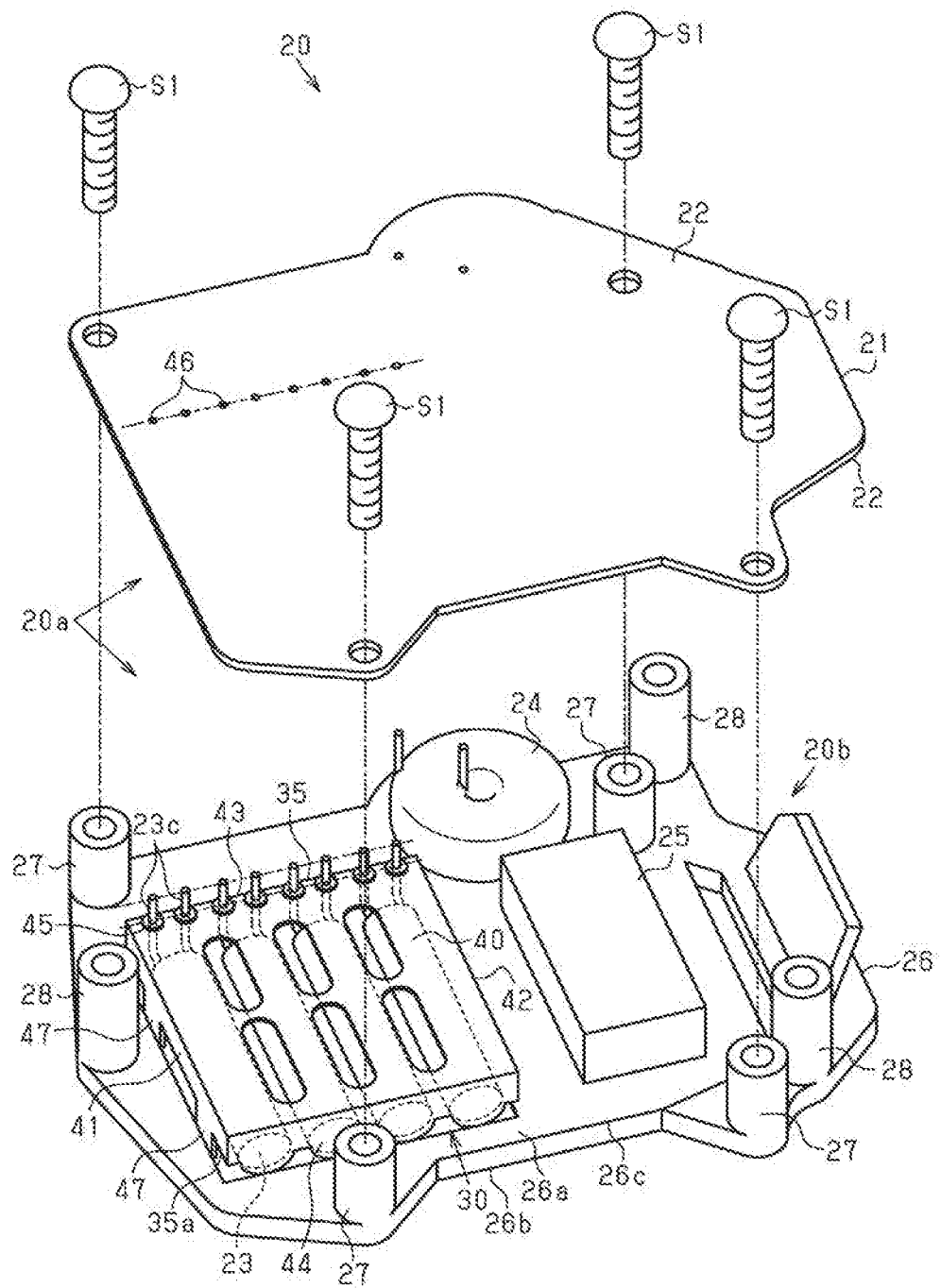
FIG. 2 is an exploded perspective view of an inverter module of the electric compressor according to the embodiment of the present invention.
Figure 3:
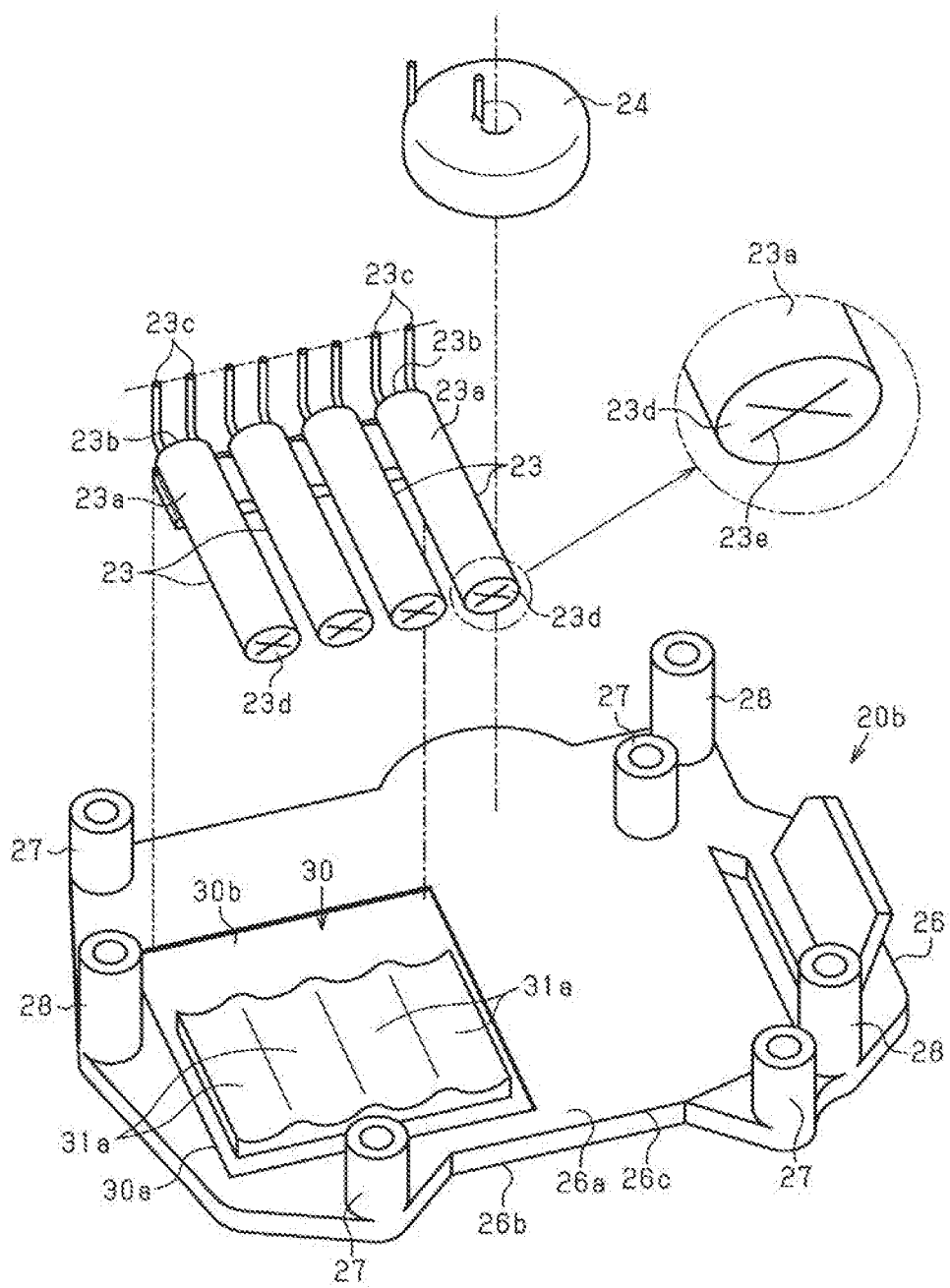
FIG. 3 is a perspective view of a base of the inverter module of the electric compressor according to the embodiment of the present invention.

As shown in FIGS. 2 and 3, the inverter module 20 includes an inverter 20a and a base 20b. The inverter 20a includes a circuit board 21, various electronic components, and a capacitor cover 35. The circuit board 21 has at least one mounting surface 22 on which the electronic components are mounted. The electronic components on the mounting surface 22 of the circuit board 21 include a plurality of electrolytic capacitors 23, a coil 24, and a semiconductor device 25.

As shown in FIG. 3, the electrolytic capacitors 23 each include a cylindrical main body 23a having a first end 23b and a second end 23d, a pair of leads 23c extending from the first end 23b of the main body 23a, and a pressure relief vent (explosion-proof vent) 23e on the second end 23d of the main body 23a.

The pressure relief vent 23e of the electrolytic capacitor 23 is designed to open so as to release the pressure from the electrolytic capacitor 23 in the event that excess pressure is caused by evaporation of the liquid electrolyte in the electrolytic capacitor 23 due to application of overvoltage to the electrolytic capacitor 23. As shown in FIGS. 2 and 3, specifically, the inverter 20a of this embodiment includes four electrolytic capacitors 23 having the same configuration.

As shown in FIGS. 2 and 3, the base 20b of the inverter module 20 has a main body 26 having a plate shape. The main body 26 of the base 20b has a first surface 26a and a second surface 26b on the opposite surfaces of the main body 26 and a peripheral edge 26c around the first surface 26a. The base 20b is made of a metal such as aluminum, for example, by die casting. The main body 26 has a plurality of cylindrical bosses 27 on the first surface 26a near the peripheral edge 26c. The bosses 27 each receive a screw S1 for fixing the circuit board 21 to the main body 26 of the base 20b. In this embodiment, four bosses 27 are formed integrally with the main body 26 along the peripheral edge 26c. The main body 26 further has therethrough a plurality of through holes 28 near the peripheral edge 26c. The through holes 28 each receive a screw S2 for fixing the main body 26 to the surface 14b, which corresponds to the outer surface of the first housing 12. In other words, the main body 26 of the base 20b is disposed between the inverter 20a of the inverter module 20 and the housing assembly 11. In this embodiment, three through holes 28 are formed along the peripheral edge 26c of the main body 26. The peripheral edge 26c of the main body 26 forms the outline of the base 20b as viewed from the first surface 26a side of the main body 26.

The first surface 26a of the main body 26 receives some of the electronic components mounted on the circuit board 21. More specifically, in this embodiment, the first surface 26a of the main body 26 receives the electrolytic capacitors 23, the coil 24, and the semiconductor device 25 of the electronic components mounted on the circuit board 21, thus, the first surface 26a of the main body 26 serves as a receiving surface for receiving the electronic components on the circuit board 21 of the inverter 20a The second surface 26b of the main body 26 serves as a contact surface that comes in contact with the bottom wall 14 of the first housing 12 when the main body 26 is fixed to the bottom wall 14. The second surface 26b of the main body 26 need not necessarily be in direct contact with the bottom wall 14 of the first housing 12. The second surface 26b of the main body 26 may be in indirect contact with the bottom wall 14 of the first housing 12 with something like an adhesion layer between the second surface 26b and the bottom wall 14. For example, as shown in FIG. 2, the first surface 26a of the main body 26 faces the circuit board 21 when the circuit board 21 is fixed to the main body 26. That is, the first surface 26a of the main body 26 faces the inverter 20a.

As shown in FIG. 3, the main body 26 has a recess 30 formed in the first surface 26a of the main body 26 in the thickness direction of the main body 26. The recess 30 has a square shape as viewed from the first surface 26a side of the main body 26. The recess 30 has a peripheral edge 30a serving as the outline of the recess 30 and a bottom surface 30b on which a metal seat 31 is disposed for receiving the electrolytic capacitors 23. The peripheral edge 30a of the recess 30 is located away from the peripheral edge 26c of the main body 26, so that the recess 30 is a closed region to the peripheral edge 26c of the main body 26. The seat 31 on the bottom surface 30b is located away from the peripheral edge 30a of the recess 30, and in this embodiment, formed integrally with the main body 26 of the base 20b. That is, the electrolytic capacitors 23 are disposed within the recess 30. In this embodiment, the inverter 20a includes the four electrolytic capacitors 23. To fit the outer peripheries of the four cylindrical electrolytic capacitors 23, the seat 31 has four arched portions 31a each having an arc shape.

The electrolytic capacitors 23 are placed on the seat 31 on the base 20b. The electrolytic capacitors 23 need not necessarily be in direct contact with the seat 31. The electrolytic capacitors 23 may be in indirect contact with the seat 31 with something like an adhesion layer between the electrolytic capacitors 23 and the arched portions 31a of the seat 31.

In this embodiment, the inverter 20a includes the capacitor cover 35 at least partly covering the electrolytic capacitors 23. The capacitor cover 35 is made of plastic. As shown in FIG. 2, the electrolytic capacitors 23 disposed within the recess 30 are accommodated in the capacitor cover 35.

The configuration of the capacitor cover 35 is described in detail with reference to FIGS. 2, 4, and 5 herein.

As shown in FIG. 2, the capacitor cover 35 has a box shape with an opening. Specifically, the capacitor cover 35 has a square top portion 40, four side walls 41 to 44 extending down from the periphery of the top portion 40 toward the bottom edge of the capacitor cover 35 and cooperating to form the opening of the capacitor cover 35, and an opening edge 35a of the opening formed by the edges of the four side walls 41 to 44 at the bottom edge of the capacitor cover 35. The four electrolytic capacitors 23 lie alongside in the capacitor cover 35 such that the central axes of the electrolytic capacitors 23e become parallel to the circuit board 21 and the second ends 23d of the electrolytic capacitors 23e are oriented parallel to the circuit board 21. The side walls 41, 42 are parallel to the axial directions of the electrolytic capacitors 23 accommodated in the capacitor cover 35. The side walls 43, 44 are connected with the side walls 41, 42. The side walls 43, 44 face the first ends 23b and the second ends 23d of the electrolytic capacitors 23, respectively. Specifically, the side wall 43 faces the first ends 23b from which the leads 23c extend, and the side wall 44 faces the second ends 23d on which the pressure relief vents 23e are formed. That is, the side wall 44 corresponds to the wall of the present invention that is opposed to the second ends 23d of the electrolytic capacitors 23.

Figure 4:
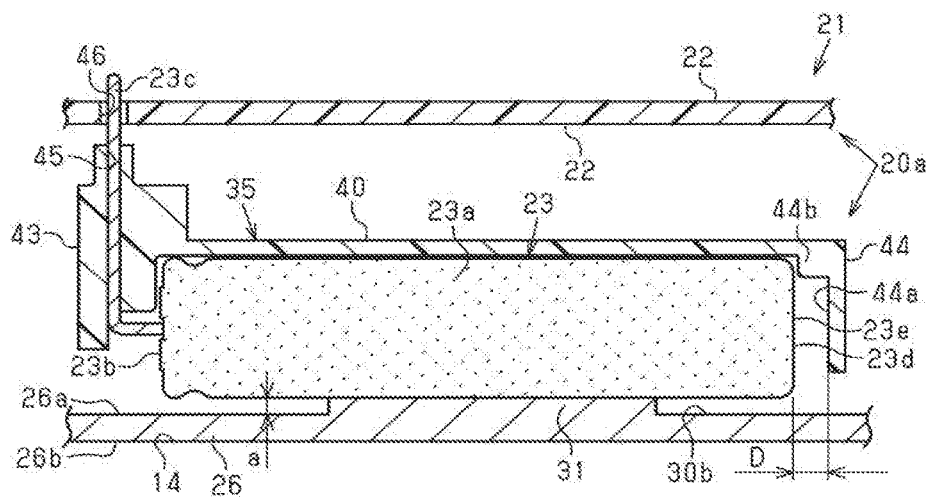
FIG. 4 is a sectional view of the base, a circuit board, an electrolytic capacitor, and a capacitor cover of the electric compressor according to the embodiment of the present invention.

As shown in FIG. 4, the side wall 43 of the capacitor cover 35 is formed thicker than the side walls 41, 42, 44 of the capacitor cover 35. The side wall 43 has a plurality of through holes 45. The through holes 45 are formed through the side wall 43 from the bottom edge side to the top portion 40 side of the capacitor cover 35 to allow the leads 23c extending from the electrolytic capacitors 23 to pass through the capacitor cover 35. In this embodiment, the side wall 43 has eight through holes 45. Each of the leads 23c extends from the first end 23b of the electrolytic capacitor 23 and bends at a right angle toward the circuit board 21 through the through hole 45 of the side wall 43, so that the lead 23c has two portions that are perpendicular to each other. Each of the leads 23c passes through the corresponding through hole 45 of the side wall 43 and partly sticks out from the capacitor cover 35. As shown in FIGS. 4 and 5, the leads 23c sticking out from the capacitor cover 35 respectively pass through through holes 46 formed through the circuit board 21 and are fixed to the circuit board 21 by means such as soldering for electrically connecting the electrolytic capacitors 23 and the circuit board 21 at installation of the circuit board 21 to the base 20b.

Figure 5:
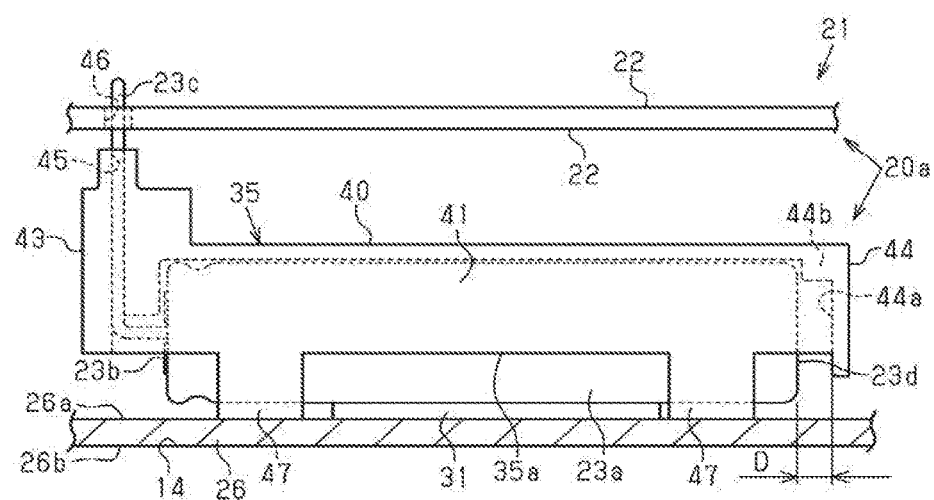
FIG. 5 is a partial sectional view of the base, the circuit board, the electrolytic capacitor, and the capacitor cover of FIG. 4.

As shown in FIGS. 2 and 5, the side walls 41, 42 of the capacitor cover 35 each have a plurality of projection portions 47. The projection portions 47 extend from the edges of the side walls 41, 42 corresponding to the part of the opening edge 35a of the capacitor cover 35. In other words, the opening edge 35a of the capacitor cover 35 has the projection portions 47 extending from the opening edge 35a. The projection portions 47 extending from each of the side walls 41, 42 are located away from each other. In this embodiment, each of the side walls 41, 42 has two projection portions 47. As shown in FIG. 5, the electrolytic capacitors 23 accommodated in the capacitor cover 35 are placed on the seat 31 of the base 20b. The main bodies 23a of the electrolytic capacitors 23 on the seat 31 are located away from the bottom surface 30b of the recess 30 at the "distance a" indicated in FIG. 5. The projection portions 47 of the side walls 41, 42 are designed to be of sufficient length to contact the bottom surface 30b of the recess 30 with the electrolytic capacitors 23 accommodated in the capacitor cover 35 placed on the seat 31 within the recess 30.

As shown in FIG. 4, the side wall 44 of the capacitor cover 35 corresponds to the wall opposed to the second ends 23d of the electrolytic capacitors 23 accommodated in the capacitor cover 35. In other words, the side wall 44 of the capacitor cover 35 corresponds to the wall opposed to the pressure relief vents 23e on the second ends 23d of the electrolytic capacitors 23 accommodated in the capacitor cover 35. The side wall 44 has an opposing surface portion 44a. The opposing surface portion 44a faces and is located away from the pressure relief vents 23e on the second ends 23d of the electrolytic capacitors 23. Specifically, the opposing surface portion 44a of the side wall 44 is located away from the pressure relief vents 23e on the second ends 23d of the electrolytic capacitors 23 in the axial directions of the electrolytic capacitors 23 at the distance D shown in FIG. 4.

The distance D is designed to secure at least reasonable distance that enables the pressure relief vents 23e of the electrolytic capacitors 23 to split open without interference by the side wall 44 of the capacitor cover 35. Specifically, pressure may be built up in any of the electrolytic capacitors 23 and push the pressure relief vent 23e outward, so that the pressure relief vent 23e may split open and turn outward in the event that excess pressure is generated in the electrolytic capacitor 23. For the smooth opening of the pressure relief vent 23e on the second end 23d, the distance D is determined against the interference between the pressure relief vent 23e to be opened outward from the second end 23d and the side wall 44 of the capacitor cover 35.

The side wall 44 of the capacitor cover 35 has a positioning portion 44b to determine the positions of the electrolytic capacitors 23 accommodated in the capacitor cover 35. The positioning portion 44b projects toward the second ends 23d of the electrolytic capacitors 23 from a surface portion of the side wall 44, which is a surface portion facing the second ends 23d of the electrolytic capacitors 23 other than the opposing surface portion 44a. In this embodiment, the positioning portion 44b of the side wall 44 is located adjacent to the top portion 40 of the capacitor cover 35. The positioning portion 44b is operable to prevent the axial displacement of the electrolytic capacitors 23 accommodated in the capacitor cover 35.

The capacitor cover 35 accommodating the electrolytic capacitors 23 is placed on the base 20b of the inverter module 20 such that the opening edge 35a of the capacitor cover 35 faces the base 20b and the electrolytic capacitors 23 come into contact with the base 20b. In this embodiment, the electrolytic capacitors 23 come into contact with the seat 31 on the base 20b. Then, the circuit board 21 is fixed to the base 20b of the inverter module 20 to complete the assembly of the inverter module 20. Accordingly, a part of the capacitor cover 35 is interposed between the circuit board 21 and the peripheral edges of the second ends 23d of the electrolytic capacitors 23. In this embodiment, the top portion 40 of the capacitor cover 35 is interposed between the circuit board 21 and the peripheral edges of the second ends 23d of the electrolytic capacitors 23.

The following will describe an operation of the electric compressor 10 according to the embodiment of the present invention with reference to FIGS. 4 and 5.

As shown in FIG. 4, the top portion 40 of the capacitor cover 35 having a box shape is interposed between the circuit board 21 and the electrolytic capacitors 23, and the peripheral edges of the second ends 23d of the electrolytic capacitors 23 are surrounded by the top portion 40 and the side walls 41, 42, 44 of the capacitor cover 35. That is, a part of the capacitor cover 35 is interposed between the circuit board 21 and the peripheral edges of the second ends 23d of the electrolytic capacitors 23. In the event that any of the pressure relief vents 23e of the electrolytic capacitors 23 is forcibly opened by the pressure build-up in the electrolytic capacitor 23, in this embodiment, the top portion 40 and the side walls 41, 42, 44 of the capacitor cover 35 prevents the liquid electrolyte from being splashed out of or seeping from the electrolytic capacitor 23 into the circuit board 21.

The above embodiment offers the following effects.

(1) A part of the capacitor cover 35 is interposed between the circuit board 21 and the peripheral edges of the second ends 23d of the electrolytic capacitors 23. In the event that any of the pressure relief vents 23e of the electrolytic capacitors 23 is forcibly opened, this configuration prevents the liquid electrolyte from being splashed out of or seeping from the electrolytic capacitor 23 into the whole circuit board 21, thereby preventing a short circuit.

(2) The opposing surface portion 44a of the side wall 44 of the capacitor cover 35 is located away from the pressure relief vents 23e on the second ends 23d of the electrolytic capacitors 23. This configuration prevents the capacitor cover 35 from interfering with the opening of the pressure relief vents 23e of the electrolytic capacitors 23 accommodated in the capacitor cover 35. That is, this configuration enables the pressure relief vents 23e of the electrolytic capacitors 23 accommodated in the capacitor cover 35 to open successfully so as to release pressure that may be built up in the electrolytic capacitors 23.

(3) The side wall 44 of the capacitor cover 35 has the positioning portion 44b, so that the side wall 43 and the positioning portion 44b of the side wall 44 cooperate to keep the electrolytic capacitors 23 in desired positions stably although a part of the side wall 44, specifically, the opposing surface portion 44a of the side wall 44 is located away from the second ends 23d of the electrolytic capacitors 23.

(4) The capacitor cover 35 accommodating the electrolytic capacitors 23 is disposed within the recess 30 in the first surface 26a of the main body 26 of the base 20b. This configuration enables the recess 30 to function as a reservoir to collect the liquid electrolyte that may be splashed out of or seep from any of the electrolytic capacitors 23 in the event that the pressure relief vent 23e of the electrolytic capacitor 23 is forcibly opened. Accordingly the liquid electrolyte is unlikely to seep into the whole base 20b.

(5) The side walls 41, 42 of the capacitor cover 35 each have the projection portions 47 configured to come into contact with the bottom surface 30b of the recess 30. This configuration enables the capacitor cover 35 and the electrolytic capacitors 23 to be kept in desired positions stably within the recess 30. That is, this configuration eliminates or minimizes possible damages on the electrolytic capacitors 23, for example, caused by a friction between the main bodies 23a of the electrolytic capacitors 23 due to an unstable placement of the electrolytic capacitors 23.

(6) The electrolytic capacitors 23 come into contact with the base 20b that comes into contact with the bottom wall 14 of the first housing 12. This configuration enables effective cooling of the electrolytic capacitors 23 as a heat-generating component. Specifically, refrigerant flowing through the inlet 16 of the first housing 12 cools down the bottom wall 14 of the first housing 12, so that the heat of the electrolytic capacitors 23 is released through the base 20b contacting the bottom wall 14 of the first housing 12.

(7) The leads 23c of the electrolytic capacitors 23 accommodated in the capacitor cover 35 pass through the through holes 45 formed through the side wall 43 of the capacitor cover 35, respectively. This configuration enables the leads 23c of the electrolytic capacitors 23 to be stably supported by the inner surfaces of the through holes 45 for maintaining the successful and stable connection between the electrolytic capacitor 23 and the circuit board 21 via the leads 23c.

(8) The electrolytic capacitors 23 are disposed such that the second ends 23d are oriented parallel to the circuit board 21. In the event that any of the pressure relief vents 23e of the electrolytic capacitors 23 is forcibly opened, the liquid electrolyte is guided by the top portion 40 and the side wall 44 to be splashed out of or seeping from the electrolytic capacitor 23 in a direction opposite to the circuit board 21.

Although the specific embodiment has been described above, the present invention is not limited thereto, and the invention may appropriately be modified within the gist of the present invention.

The capacitor cover 35 may take any shape as long as the capacitor cover 35 is configured to be interposed between the peripheral edges of the second ends 23d of the electrolytic capacitors 23 and the circuit board 21 so as to cover the peripheral edges of the second ends 23d as a part of the electrolytic capacitors 23. For example, the capacitor cover 35 may be formed by a plate-like member only.

The cover 15 may be fixed to the side wall 14a of the first housing 12 such that the cover 15 and the side wall 14a cooperate to define the accommodation space 19 in which the inverter module 20 is accommodated.

The base 20b of the inverter module 20 may be formed by the plate-shaped main body 26 only.

The base 20b of the inverter module 20 may be provided without the recess 30.

The side wall 44 of the capacitor cover 35 may be provided without the positioning portion 44b as long as the electrolytic capacitors 23 are stably kept in desired positions within the capacitor cover 35. For example, the electrolytic capacitors 23 may be adhered to the capacitor cover 35, or the capacitor cover 35 may have a locking mechanism that is configured to lock the electrolytic capacitors 23 on the inner surface of the top portion 40 of the capacitor cover 35.

The side walls 41, 42 of the capacitor cover 35 may be provided without the projection portions 47.

The inverter module 20 may be provided without the base 20b. In this case, the electrolytic capacitors 23 preferably contact the housing assembly 11. The recess 30 may be formed in the housing assembly 11 that defines the accommodation space 19 in which the inverter module 20 is accommodated.

The number of electrolytic capacitors 23 to be included in the inverter 20a may be selected as necessary.

What is claimed is:

1. An electric compressor comprising:
   a housing accommodating a compression portion and an electric motor;
   a cover attached to an outer surface of the housing, the cover cooperating with the outer surface of the housing to define an accommodation space; and
   an inverter accommodated in the accommodation space and configured to drive the electric motor, wherein
   the inverter includes a circuit board, an electrolytic capacitor, and a capacitor cover at least partly covering the electrolytic capacitor,
   the electrolytic capacitor includes a cylindrical main body having a first end and a second end, a lead extending from the first end of the main body and connected to the circuit board, and a pressure relief vent on the second end of the main body,
   the capacitor cover is interposed between the circuit board and a peripheral edge of the second end of the electrolytic capacitor,
   the capacitor cover has a wall opposed to the second end of the electrolytic capacitor,
   the wall has an opposing surface portion that faces the pressure relief vent on the second end of the electrolytic capacitor and is spaced away from the pressure relief vent,
   the capacitor cover includes a positioning portion to determine a position of the electrolytic capacitor in the capacitor cover, and
   the positioning portion projects toward the second end of the electrolytic capacitor from a portion of the wall other than the opposing surface portion.

2. The electric compressor according to claim 1, wherein the first end and the second end of the electrolytic capacitor are ends of the electrolytic capacitor in an axial direction of the electrolytic capacitor, and the electrolytic capacitor is disposed such that the axial direction of the electrolytic capacitor is parallel to the circuit board.

3. The electric compressor according to claim 1, wherein the capacitor cover has a box shape for accommodating the electrolytic capacitor.

4. The electric compressor according to claim 1, wherein
   the electric compressor includes a base having a metal main body having a plate shape and disposed between the inverter and the housing,
   the main body has a surface facing the inverter and has a recess formed in the surface in a thickness direction of the main body, and
   the electrolytic capacitor is disposed within the recess in the main body.

5. The electric compressor according to claim 4, wherein
the capacitor cover has an opening and an opening edge of the opening, and
the opening edge of the capacitor cover has a projection portion extending from the opening edge and configured to come into contact with a bottom surface of the recess.

* * * * *